United States Patent [19]

Aoki et al.

[11] Patent Number: 5,202,870
[45] Date of Patent: Apr. 13, 1993

[54] OPTICAL DISK RECORDING/REPRODUCING APPARATUS AND A PHOTOELECTRIC CONVERSION AMPLIFIER THEREFOR

[75] Inventors: Kazuhiro Aoki, Moriguchi; Yasuaki Edahiro, Hirakata; Akira Kurahashi, Yawata, all of Japan

[73] Assignee: Matsushita Electric Industrial Co., Ltd., Kadoma, Japan

[21] Appl. No.: 650,804

[22] Filed: Feb. 6, 1991

[30] Foreign Application Priority Data

Feb. 7, 1990 [JP] Japan .................. 2-27498

[51] Int. Cl.$^5$ ............................................. G11B 7/095
[52] U.S. Cl. ........................... 369/44.25; 250/201.5;
369/44.32; 369/44.35; 369/124
[58] Field of Search ............ 369/44.25, 44.32–44.36,
369/44.41, 44.42, 110, 111, 124, 32; 250/200,
201.1, 201.5, 202, 205

[56] References Cited

U.S. PATENT DOCUMENTS

| | | | |
|---|---|---|---|
| 4,637,003 | 1/1987 | Yokogawa | 369/32 |
| 4,736,354 | 4/1988 | Yoshio | 369/44.41 X |
| 4,748,610 | 5/1988 | Nakata et al. | 369/44.32 X |
| 4,847,824 | 7/1989 | Davie | 369/124 |
| 4,964,110 | 10/1990 | Horimai et al. | 369/124 X |
| 5,049,733 | 9/1991 | Yoshifusa et al. | 369/44.41 X |

FOREIGN PATENT DOCUMENTS 2556870 6/1985 France .
60-234235 11/1985 Japan .

OTHER PUBLICATIONS

Shigematsu et al., "Technical Note", Central Research Laboratory, Hitachi, Ltd., Applied Physics, vol. 55, No. 7, 1986, p. 688.
Patent Abstracts of Japan, vol. 8, No. 144, Jul. 1984, and JP 59-42650, Mar. 1984.

Primary Examiner—W. R. Young
Attorney, Agent, or Firm—Cushman, Darby & Cushman

[57] ABSTRACT

In a photoelectric conversion amplifier for converting a light signal into a voltage signal, a resistor and a capacitor connected in parallel are provided between a non-inverted input terminal of a differential amplifier and a reference voltage source terminal, and thereby an offset voltage of the differential amplifier is eliminated and a frequency characteristic is improved to have a wideband.

10 Claims, 5 Drawing Sheets

OPTICAL DISK RECORDING/REPRODUCING APPARATUS AND A PHOTOELECTRIC CONVERSION AMPLIFIER THEREFOR

FIELD OF THE INVENTION AND RELATED ART STATEMENT

1. Field of the Invention

The present invention relates to an optical disk recording/reproducing apparatus and more particularly to a reproducing signal processing circuit therefor.

2. Description of the Related Art

In recent years, development of an optical disk recording/reproducing apparatus has been popular because of very large recording capacity of the an optical disk.

FIG. 1 is a block diagram showing a conventional optical recording/reproducing apparatus. In FIG. 1, signals recorded in an optical disk 1 are read out by an optical head 37. The optical head 37 includes a laser, lenses, an actuator and a deflection beam splitter etc. A photoelectric conversion amplifier for servo signal (hereinafter is referred to as a servo signal amplifier) 42 consists of a photo-diode 38, a resistor 39, a capacitor 40 and a differential amplifier 41. Each internal circuit of servo signal amplifiers 43, 44 and 45 is the same as that of the servo signal amplifier 42. A photoelectric conversion amplifier for record signal (hereinafter is referred to as a record signal amplifier) 50 consists of a photo-diode 46, a resistor 47, a capacitor 48 and a differential amplifier 49. An internal circuit of a record signal amplifier 51 is the same as that of the record signal amplifier 50. A focus error signal detection circuit 52 is connected to the servo signal amplifiers 42 and 43. A tracking error signal detection circuit 53 is connected to the servo signal amplifiers 44 and 45. Further, a record signal detection circuit 54 is connected to the record signal amplifiers 50 and 51.

The optical head 37 receives a reflected light of a beam spot which is to be focused on the optical disk 1, and issues an optical signal of the focusing direction to the servo signal amplifiers 42 and 43. At the same time, the optical head 37 issues an optical signal of the tracking direction and a record signal recorded in the optical disk 1 to the servo signal amplifiers 44, 45 and the record signal amplifiers 50, 51, respectively.

In the servo signal amplifier 42, the photo-diode 38 makes photoelectric conversion, that is, converts the reflected light inputted thereto into a current signal. This current signal is further converted into voltage through a conversion impedance given by the resistor 39 and the capacitor 40. An output voltage of the servo signal amplifier 42 is obtained by multiplying a current value generated in the photo-diode 38 by the above-mentioned conversion impedance. The differential amplifier 41 serves to decrease a primary-converted value of the conversion impedance loaded onto the photo-diode 38 and also serves to suppress noises. The capacitor 40, which is connected in parallel with the resistor 39, serves to prevent oscillation of the servo signal amplifier 42 and also serves to limit a band of the servo signal amplifier 42. This band is determined by a resistance of the resistor 39, a capacitance of the capacitor 40 and a frequency characteristic of the differential amplifier 41. Each operation of the servo signal amplifiers 43 – 45 is quite similar to that of the servo signal amplifier 42.

It is generally necessary for each of the servo signal amplifiers 42 – 45 to have a frequency characteristic which is effective from D.C. level to hundreds of kilohertz. Since the photoelectric conversion is carried out from the D.C. level, it is also necessary for each of the servo signal amplifiers 42 – 44 to have a sufficiently low offset voltage and a stable temperature characteristic.

Each of the servo signal amplifiers 42 and 43 receives an optical focus signal in the reflected light issued from the optical head 37 and makes photoelectric conversion and current/voltage conversion, to issue the converted signal to the focus error signal detection circuit 52. Each of the servo signal amplifiers 44 and 45 receives an optical tracking signal in the reflected light issued from the optical head 37 and makes photoelectric conversion and current/voltage conversion, to issue the converted signal to the tracking error signal detection circuit 53. The focus error signal detection circuit 52 calculates a differential value between respective output voltages of the servo signal amplifiers 42 and 43 and handles its value as a focus error signal. The actuator of the optical head 37 is driven in the focus direction in response to the focus error signal. The tracking error signal detection circuit 53 calculates a differential value between respective output voltages of the servo signal amplifiers 44 and 45 and handles its value as a tracking error signal. The actuator of the optical head 37 is driven in the tracking direction in response to the tracking error signal. The record signal amplifier 50 converts the reflected light into current signal in the photo-diode 46. This current signal is converted into a voltage through a conversion impedance given by the resistor 47 and the capacitor 48. An output voltage of the record signal amplifier 50 is obtained by multiplying a current value generated in the photo-diode 46 by the above-mentioned conversion impedance. The differential amplifier 49 serves to decrease a primary-converted value of the conversion impedance loaded onto the photo-diode 46 and also serves to suppress noises. The capacitor 48, which is connected in parallel with the resistor 47, serves to prevent oscillation of the record signal amplifier 50 and also serves to limit a band of the record signal amplifier 50. This band is determined by a resistance of the resistor 47, a capacitance of the capacitor 48 and a frequency characteristic of the differential amplifier 49. Operation of the record signal amplifier 51 is quite similar to that of the record signal amplifier 50.

It is generally necessary for each of the record signal amplifiers 50 and 51 to have a frequency characteristic which is effective over the maximum frequency recorded in the optical disk 1. Further, it is necessary for each of the record signal amplifiers 50 and 51 to have a low noise characteristic. Each of the record signal amplifiers 50 and 51 receives a reproduced signal of the optical disk 1 in the reflected light issued from the optical head 37, and makes photoelectric conversion and current/voltage conversion, to issue the converted signal to the record signal detection circuit 54. The record signal detection circuit 54 receives respective output signals from the record signal amplifiers 50, 51 and thereby detects signals recorded in the optical disk 1.

However, in the above-mentioned conventional optical disk recording/reproducing apparatus, since the servo signal and the record signal are separately reproduced by respective reproducing systems, it is indispensable for the optical head 37 to provide optical paths for both the servo signal and the record signal. It is therefore difficult to minimize the size and reduce weight of the optical head 37. Besides, plural photoelectric conversion amplifiers 42 — 45, 50 and 51 are necessary for both servo signal and record signal. Therefore, the number of such amplifiers can not be reduced. Further, when an input current flows into an input end of the differential amplifier 41 in the servo signal amplifier 42, 43 — 45, 50 or 51 generation of an offset voltage is unavoidable. Moreover, it is necessary for each input end of the focus error signal detection circuit and the tracking error signal detection circuit to provide a circuit which eliminates the offset voltage.

OBJECT AND SUMMARY OF THE INVENTION

An object of the present invention is to offer a photoelectric conversion amplifier having a frequency characteristic, which is effective from D.C. level to a high frequency over the maximum frequency recorded in the optical disk, and generating only little noise and little offset voltage. The invention can also offer an optical disk recording/reproducing apparatus using the above-mentioned photoelectric conversion amplifier.

In order to achieve the above-mentioned object, a photoelectric conversion amplifier of the present invention comprises:

a differential amplifier;

a photo-diode, an anode of which is connected to an inverted input terminal of the differential amplifier, for converting a light signal into an electric signal;

a first resistor connected between the inverted input terminal and an output terminal of the differential amplifier;

a first capacitor connected in parallel with the first resistor;

a second resistor connected between a non-inverted input terminal of the differential amplifier and a reference voltage source terminal; and a second capacitor connected in parallel with the second resistor.

The above-mentioned photoelectric conversion amplifier has a wide band frequency characteristic, and generation of noise is very little. Further, this photoelectric conversion amplifier eliminates an error caused by an offset voltage. Besides, simple construction is advantageous to the fabrication by integrated circuits.

In case the above-mentioned photoelectric conversion amplifier is employed for an optical disk recording/reproducing apparatus, a servo signal and a record signal are reproduced at the same time. This contributes to minimization of size and reduction of weight of an optical head, and also, scale of circuit is compact since number of components of the photoelectric conversion amplifier decreases. Further, since this amplifier has no offset voltage, operation of the optical disk recording/reproducing apparatus is stable despite that no offset-removing circuit is provided in focus error signal detection means and tracking error signal detection means.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, a preferred embodiment of the present invention is described with reference to the accompanying drawings.

Figure 1:
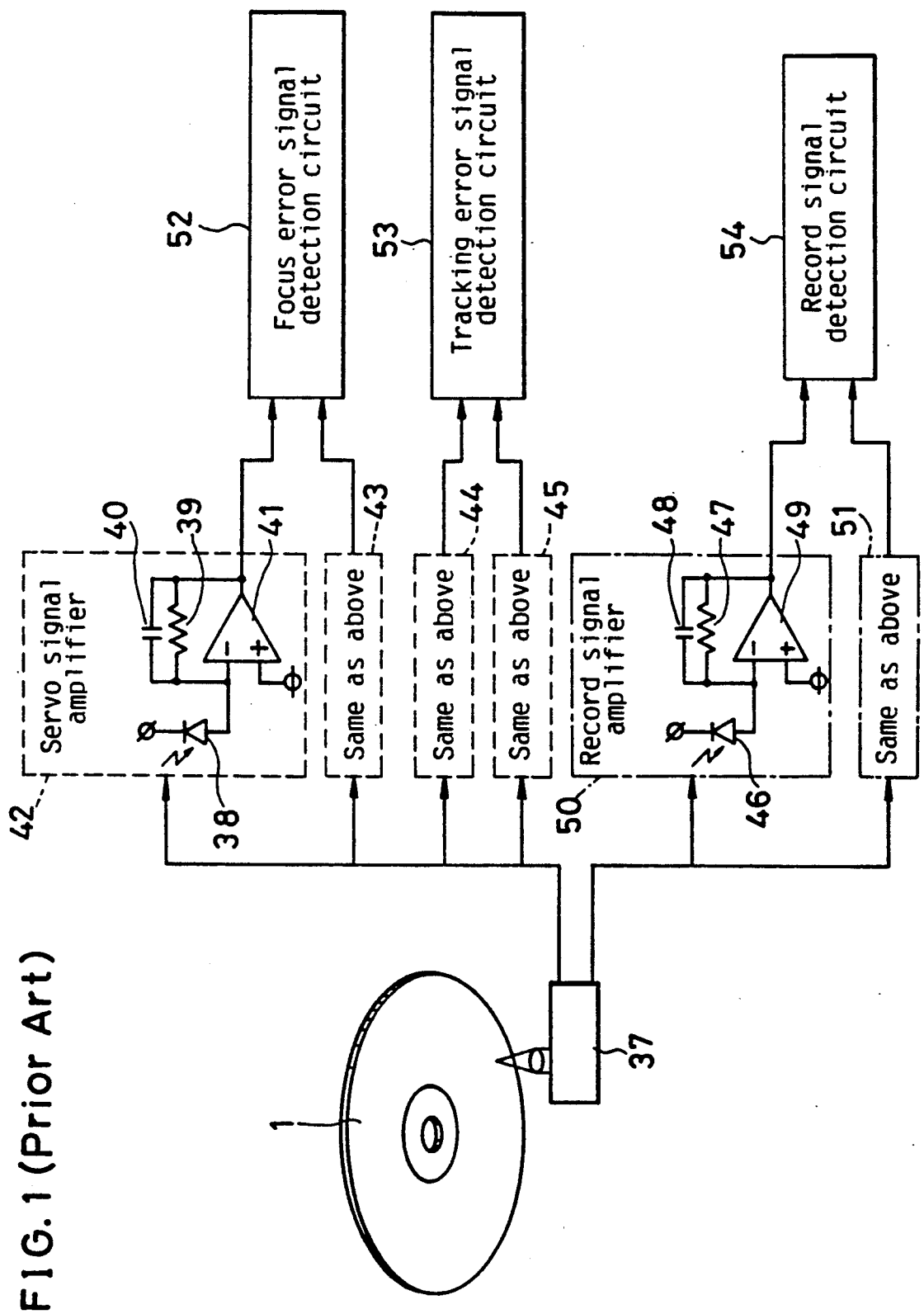
FIG. 1 is a block diagram showing the conventional optical recording/reproducing apparatus.
Figure 2:
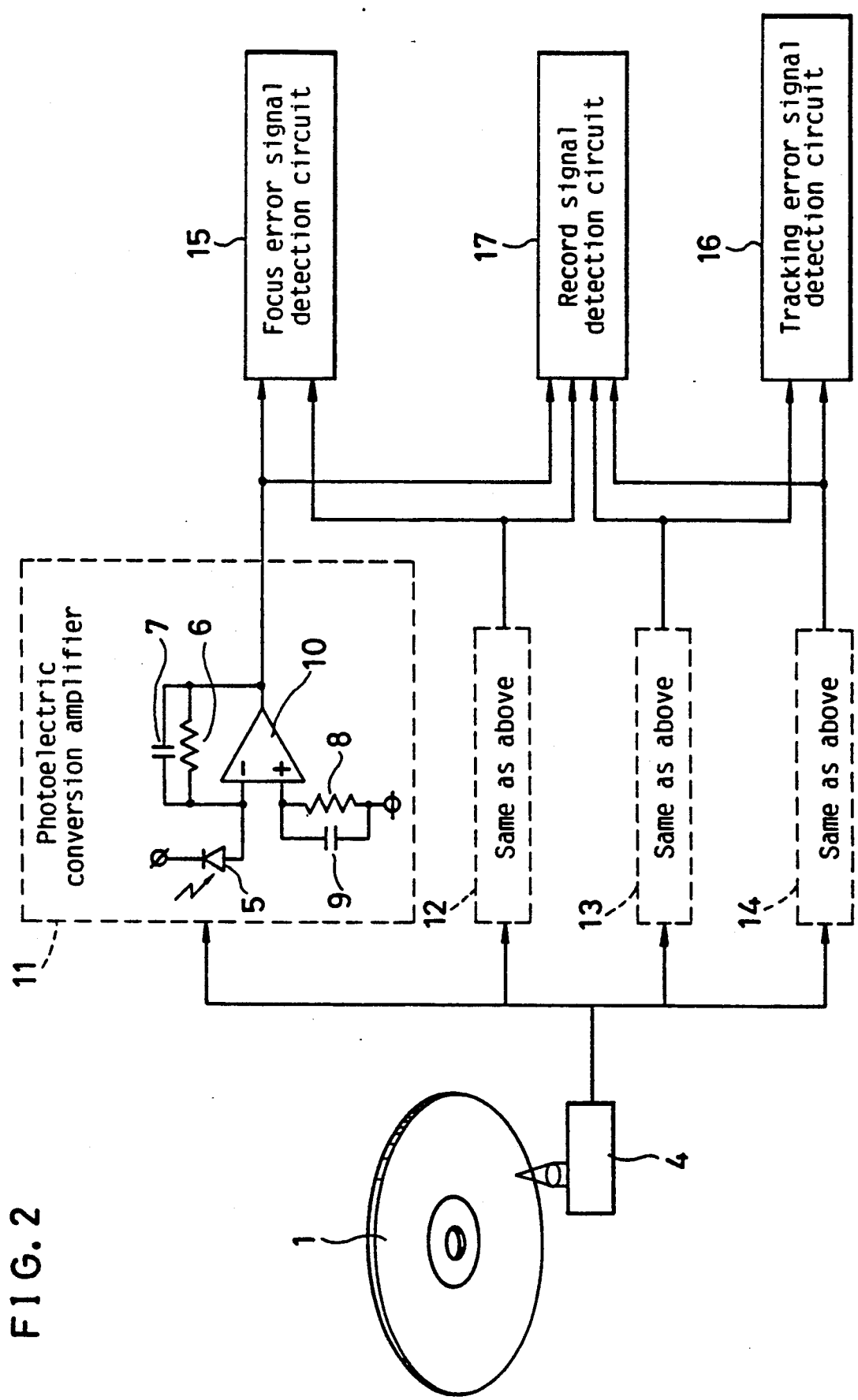
FIG. 2 is a block diagram showing an embodiment of an optical recording/reproducing apparatus in the present invention.

FIG. 2 is a block diagram showing an optical disk recording/reproducing (only reproducing diagram is shown) apparatus. In FIG. 2, signals recorded in an optical disk 1 are read out by an optical head 4. The optical head 4 consists of a laser, lenses, an actuator and a deflection beam splitter etc. Each of photoelectric conversion amplifiers 11, 12, 13 and 14 consists of a photo-diode 5, resistors 6, 8, capacitors 7, 9 and a differential amplifier unit 10. A focus error detection circuit 15 detects a focus error signal from output signals of the photoelectric conversion amplifiers 11 and 12, thereby realizing a focus servo control. A tracking error detection circuit 16 detects a tracking error signal from output signals of the photoelectric conversion amplifiers 13 and 14, thereby realizing a tracking servo control. A record signal detection circuit 17 detects signals recorded in the optical disk 1 from output signals of the photoelectric conversion amplifiers 11 — 14.

Figure 3:
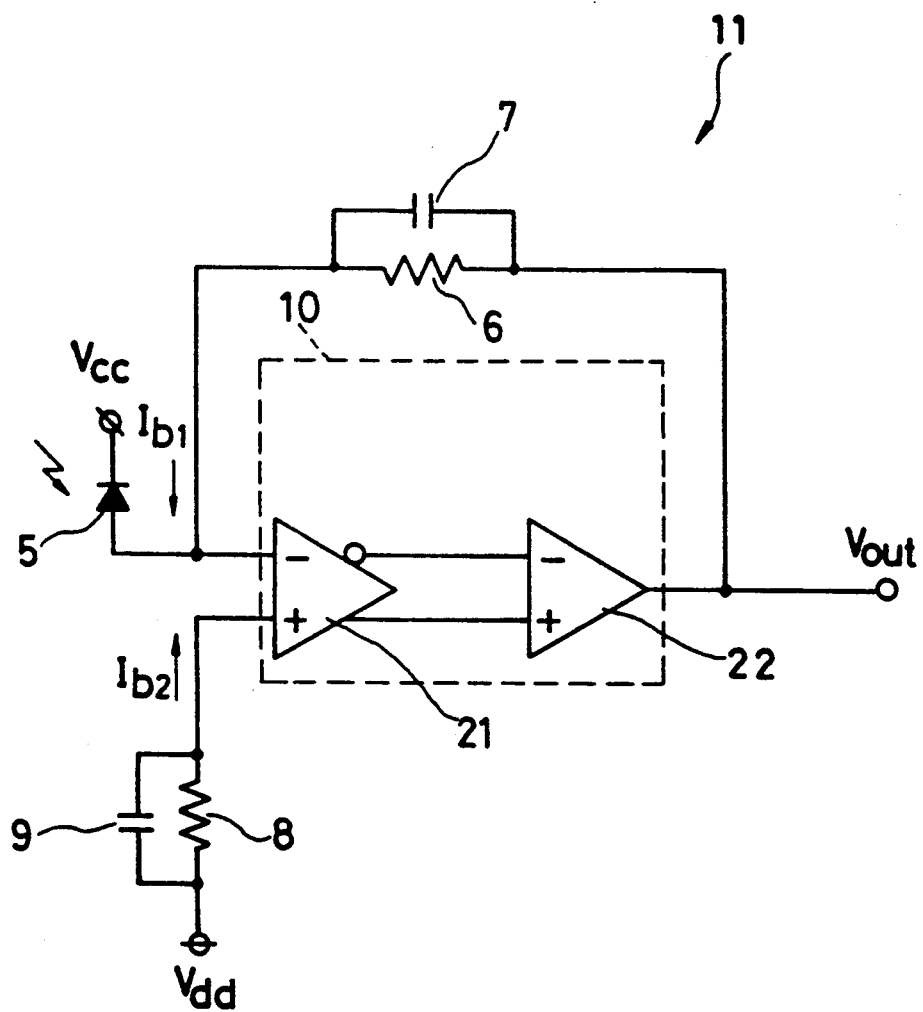
FIG. 3 is a circuit diagram showing only each internal circuit of photoelectric conversion amplifiers 11 – 14 in FIG. 2.

FIG. 3 is a circuit diagram showing an embodiment of each internal circuit of the photoelectric conversion amplifiers 11 — 14. The differential amplifier unit 10 consists of a pair of differential amplifiers 21 and 22. An inverted output terminal and a non-inverted output terminal of the differential amplifier 21 are connected to an inverted input terminal and a non-inverted input terminal of the differential amplifier 22, respectively.

Figure 4:
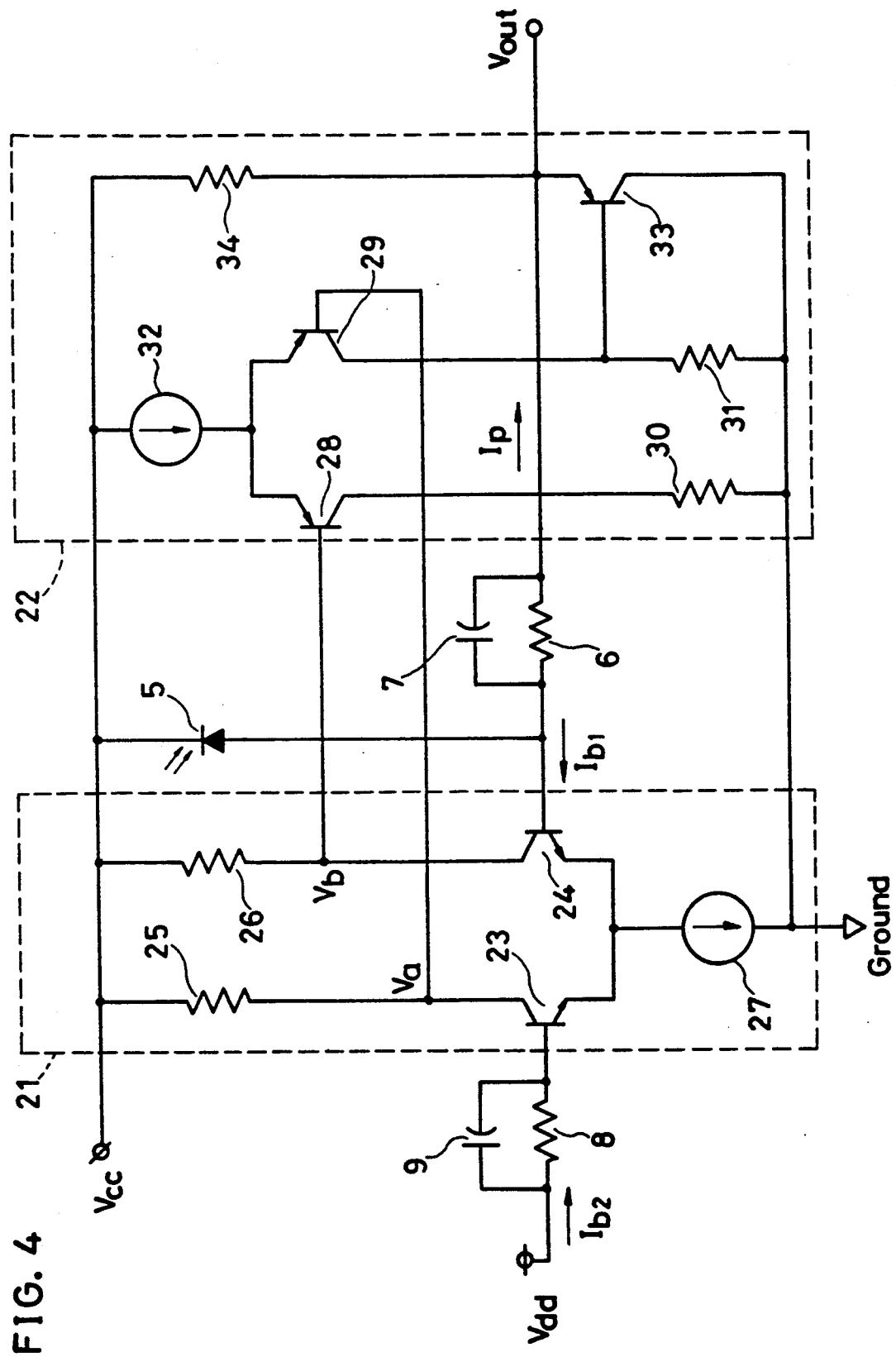
FIG. 4 is a circuit diagram showing a further detailed circuit of each of photoelectric conversion amplifiers 11 – 14 in FIG. 2.

FIG. 4 is a circuit diagram showing a further detailed circuit of each of the photoelectric conversion amplifiers 11 – 14. In FIG. 4, the differential amplifier 21 consists of a pair of NPN transistors 23, 24, a pair of resistors 25, 26 and a constant current source 27. Also, the differential amplifier 22 consists of three PNP transistors 28, 29, 33, resistors 30, 31, 34 and a constant current source 32. One end of each of the resistors 25, 26, 34, a cathode of the photo-diode 5 and one end of the constant current source 32 are connected to a power source terminal $V_{cc}$. Each one end of the capacitor 9 and the resistor 8 is connected to a reference voltage source terminal $V_{dd}$. An inverted input terminal of the differential amplifier 21 is a base of the transistor 24, and a non-inverted input terminal of the differential amplifier 21 is a base of the transistor 23. Collectors of the transistors 24 and 23 serve as the inverted output terminal and the non-inverted output terminal, respectively. The inverted input terminal and the non-inverted input terminal of the differential amplifier 22 are a base of the transistor 28 and a base of the transistor 29, respectively.

Next, operation of the above-mentioned optical disk recording/reproducing apparatus is described.

In FIG. 2, the optical head 4 receives a reflected light of a beam spot focused on the optical disk 1, and issues an optical signal of the focusing direction to the photoelectric conversion amplifier 11, 12 and also issues an optical signal of the tracking direction to the photoelectric conversion amplifier 13 and 14.

In each of the photoelectric conversion amplifiers 11 — 14, the photo-diode 5 makes photoelectric conversion, that is, it converts the reflected light inputted thereto into current signal. This current signal is further converted into voltage signal by means of a conversion impedance given by the resistor 6 and the capacitor 7. Each of the photoelectric conversion amplifier 11 — 14 has a frequency characteristic which is effective from the D.C. to the maximum frequency recorded in the optical disk 1. Each of the photoelectric conversion amplifiers 11 and 12 makes photoelectric conversion and current/voltage conversion to the optical signal in the focus direction included in the reflected light issued from the optical head 4, and issues the voltage to the focus error detection circuit 15. Each of the photoelectric conversion amplifiers 13 and 14 makes photoelectric conversion and current/voltage conversion to the optical signal in the tracking direction included in the reflected light issued from the optical head 4, and issues the voltage to the tracking error detection circuit 16. Further, each of the photoelectric conversion amplifiers 11 — 14 issues the record signal recorded in the optical disk 1 to the recorded signal detection circuit 17. The focus error detection circuit 15 calculates a differential value between output voltages of the photoelectric conversion amplifiers 11 and 12 and handles this value as a focus error signal. The actuator of the optical head 4 is driven in the focus direction in response to the focus error signal. The tracking error detection circuit 16 calculates a differential value between output voltages of the photoelectric conversion amplifiers 13 and 14 and handles this value as a tracking error signal. The actuator of the optical head 4 is driven in the tracking direction in response to the tracking error signal. The record signal detection circuit 17 detects the record signal recorded in the optical disk 1 from output signals of the photoelectric conversion amplifiers 11 — 14.

In the above-mentioned optical disk recording/reproducing apparatus, operation of the photoelectric conversion amplifier 11 is described hereafter. In FIG. 3, the voltage $V_{cc}$ is applied to the cathode of the photo-diode 5, that is, the photo-diode 5 is biased in the reverse direction. The voltage $V_{cc}$ and the voltage $V_{dd}$, which is applied to the resistor 8 and the capacitor 9, have a relation:

$$V_{cc} \geq 2 \times V_{dd} \qquad (1)$$

The reverse bias applied to the photo-diode 5 is a voltage of $(V_{cc} - V_{dd})$. Now, definitions of the following letters are made:

$Z_f$: conversion impedance given by the resistor 6 and the capacitor 7, and $Z_{bi}$: impedance given by the resistor 8 and the capacitor 9.

The differential amplifier unit 10 is provided in order to reduce a primary-converted value of the conversion impedance $Z_f$ which is loaded to the photo-diode 5. Further, the differential amplifier unit 10 serves to suppress noises generated in the photoelectric conversion amplifier 11 — 13 or 14. A primary-converted impedance $Z_{in}$ varies in response to its open-loop gain G, that is:

$$Z_{in} = Z_f / G \qquad (2)$$

The capacitor 7, which is connected in parallel with the resistor 6, serves to prevent oscillation of the photoelectric conversion amplifier 11 — 13 or 14 and limits its band. In order to provide the photoelectric conversion amplifier 11 with a wide band and low noise performance, it is necessary for the differential amplifier unit 10 to have the open loop gain G in a frequency higher than the maximum frequency recorded in the optical disk 1. Although the differential amplifier unit 10 of this embodiment consists of two differential amplifiers 21 and 22, it can be constituted by one differential amplifiers in place of two differential amplifiers.

Figure 5:
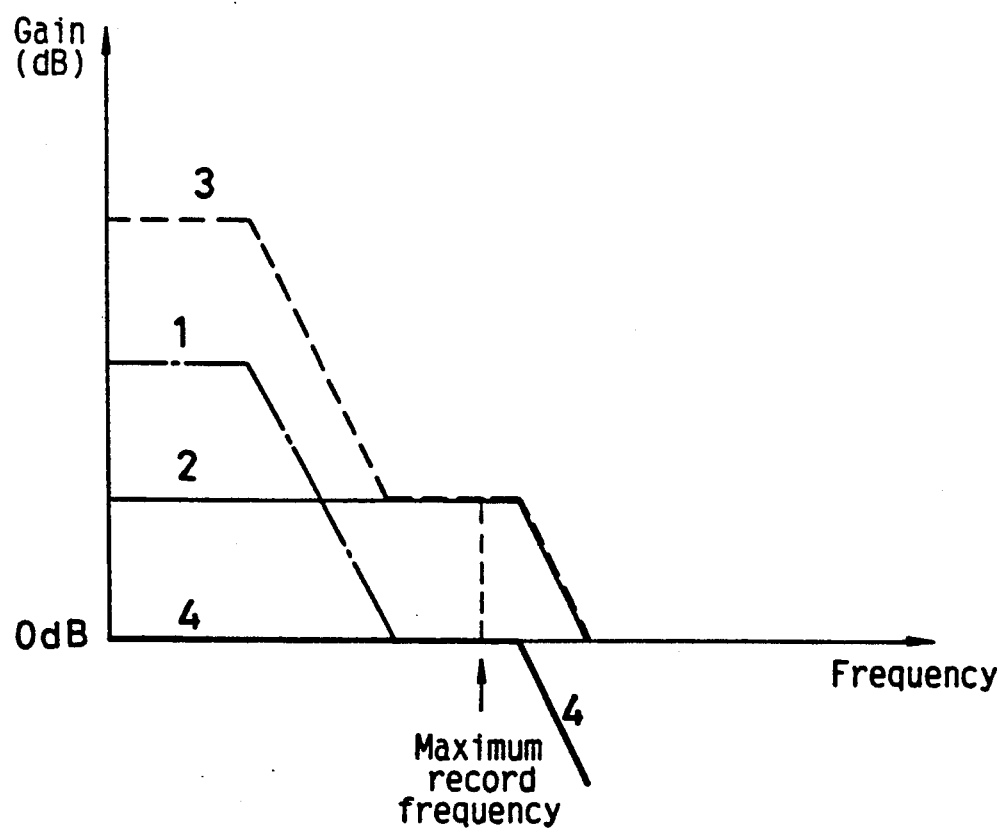
FIG. 5 is a graph showing open-loop gain characteristics in case where the differential amplifier unit 10 consists of two differential amplifiers 21 and 22.

FIG. 5 is a graph showing open-loop gain characteristics in case where the differential amplifier unit 10 consists of two differential amplifiers 21 and 22. A characteristic curve 1 represents an open-loop gain of the differential amplifier 21, and a characteristic curve 2 represents an open-loop gain of the differential amplifier 22. A characteristic curve 3 is obtained by adding the curve 2 and the curve 3. Thus, the differential amplifier unit 10 having the open-loop gain over the wide band can be realized. The above-mentioned characteristic curves 1 and 2 may be reversed to each other. That is, even when the characteristic curves 1 and 2 represent the open-loop gains of the differential amplifiers 22 and 21, respectively, a resultant open-loop gain which is realized by the differential amplifier unit 10 is not changed. By realizing this open-loop gain, the photoelectric conversion amplifier 11 has a closed-loop gain shown by a curve 4 which is flat from D.C. to a high frequency region. In FIG. 3, a resistance of the resistor 8, which is connected to a non-inverted terminal of the differential amplifier 21, is selected equal to that of the resistor 6.

When an input current $I_{b1}$ flows into an inverted terminal of the differential amplifier 21, an offset voltage $V_{off1}$ is induced between both ends of the resistor 6. Also, when an input current $I_{b2}$ flows into a non-inverted terminal of the differential amplifier 21, an offset voltage $V_{off2}$ is induced across both ends of the resistor 8. Since the input current $I_{b1}$ is substantially equal to the input current $I_{b2}$, an output voltage $V_{out}$ of the photoelectric conversion amplifier 11 is represented by an equation:

$$V_{out} = V_{dd} - (V_{off1} - V_{off2}) = V_{dd} \qquad (3).$$

The offset voltage induced by the input current of the differential amplifier 21 is thus removed. Furthermore, undesirable temperature characteristic of the offset voltage, which is caused by fluctuation of the input current in response to change of temperature, is removed similarly. A capacitance of the capacitor 9 is selected to make a relation such that the impedance $Z_{bi}$ connected to the non-inverted terminal of the differential amplifier unit 10 are equal to the impedance $Z_f$ connected to the inverted terminal of the differential amplifier unit 10, thereby improving the frequency characteristic in a high frequency region.

In FIG. 4, since the transistors 23 and 24, which are disposed at the input stage of the differential amplifier 21, are driven by the constant current source 27, each operation of them is carried out within an active region. The open-loop gain is determined by a ratio of each of emitter resistances of the transistors 23 and 24 to each of resistances of the resistors 25 and 26. Since the open-loop gain is large, voltages $V_a$ and $V_b$, which are generated through the resistors 25, 26, respectively, are dependent on a current of the constant current source 27. Therefore, each of these voltages $V_a$ and $V_b$ is not changed, and thereby both the base currents $I_{b1}$ and $I_{b2}$ of the transistors 23 and 24 are not changed either. Therefore, a current $I_p$ generated in the photo-diode 5 does not flow into the base of the transistor 24. All this current $I_p$ flows into the resistor 6 and the capacitor 7 and is converted to a voltage thereat. Since the transistors 28 and 29, which are disposed at an input stage of the differential amplifier 22, are driven by the constant current source 32, each of them operates within the active region. An output signal of the differential amplifier 22 is issued through an emitter follower constituted by the PNP transistor 33 and the resistor 34. This output signal is fed back through the resistor 6 and the capacitor 7 to a base of the NPN transistor 24 in the differential amplifier 21, i.e., the inverted input terminal of the differential amplifier 21. An output voltage $V_{out}$ of the photoelectric conversion amplifier 11 is obtained by an equation:

$$V_{out} = V_{dd} - (I_p \times Z_f) \qquad (4).$$

As has been described with reference to FIG. 3, when a base current flows into the NPN transistors 23 and 24, no offset voltage appears in an output signal of the photoelectric conversion amplifier 11. Therefore, there is no problem in employing the NPN transistor at the input state of the differential amplifier 21. Besides, in the input stage of the differential amplifier 21, an N-channel FET can be used in place of the NPN transistor. Also, in the input stage of the differential amplifier 22, a P-channel FET can be used in place of the PNP transistor.

Furthermore, apart from the above-mentioned embodiment wherein one end of the constant voltage source 27 and each one end of the resistors 30, 31 and a collector of the PNP transistor 33 are grounded against the reference voltage $V_{dd}$ (FIG. 4), another embodiment may be such that the above-mentioned one end of the constant voltage source 27 and each one end of the resistors 30, 31 and the collector of the PNP transistor 33 are connected to a negative voltage $(-V_{dd})$ terminal against a reference voltage grounded.

In FIG. 2, although only the block diagram of the reproducing system is shown, the photoelectric conversion amplifier of the present invention can be similarly used in a recording or erasing system because of its stable recording or erasing operation based on the wide band dual (servo signal and record signal) signal processing performance.

Although the present invention has been described in terms of the presently preferred embodiments, it is to understood that such disclosure is not to be interpreted as limiting. Various alterations and modifications will no doubt become apparent to those skilled in the art after having read the above disclosure. Accordingly, it is intended that the appended claims to interpreted as covering all alterations and modifications as fall within the true spirit and scope of the invention.

What is claimed is:

1. A photoelectric conversion amplifier comprising:
   a differential amplifier;
   a photo-diode, an anode of which is directly connected to an inverted input terminal of said differential amplifier, for converting a light signal into an electric signal;
   a first resistor connected between said inverted input terminal and an output terminal of said differential amplifier;
   a first capacitor connected in parallel with said first resistor;
   a second resistor connected between a non-inverted input terminal of said differential amplifier and a reference voltage source terminal; and
   a second capacitor connected in parallel with said second resistor, wherein said second resistor and said second capacitor are the only elements connected to said non-inverted input terminal of said differential amplifier.

2. An optical disk recording/reproducing apparatus comprising:
   an optical head which emits a laser light to an optical disk and issues light signals reflected from said optical disk;
   a photo electric conversion amplifier means for converting said light signals into a voltage signal;
   focus error signal detection means for detecting a focus error signal from said voltage signal; and wherein said photoelectric conversion amplifier means includes,
   a differential amplifier;
   a photo-diode, an anode of which is directly connected to an inverted input terminal of said differential amplifier, for converting a light signal into an electric signal;
   a first resistor connected between said inverted input terminal and an output terminal of said differential amplifier;
   a first capacitor connected in parallel with said first resistor;
   a second resistor connected between a non-inverted input terminal of said differential amplifier and a reference voltage source terminal; and
   a second capacitor connected in parallel with said second resistor, wherein said second resistor and said second capacitor are the only elements connected to said non-inverted input terminal of said differential amplifier.

3. An optical disk recording/reproducing apparatus comprising:
   an optical head which emits a laser light to an optical disk and issues light signals reflected from said optical disk;
   a photo electric conversion amplifier means for converting said light signals into a voltage signal;
   tracking error signal detection means for detecting a tracking error signal from said voltage signal; and wherein said photoelectric conversion amplifier means includes,
   a differential amplifier;
   a photo-diode, an anode of which is directly connected to an inverted input terminal of said differential amplifier, for converting a light signal into an electric signal;
   a first resistor connected between said inverted input terminal and an output terminal of said differential amplifier;
   a first a capacitor connected in parallel with said first resistor;
   a second resistor connected between a non-inverted input terminal of said differential amplifier and a reference voltage source terminal; and
   a second capacitor connected in parallel with said second resistor, wherein said second resistor and said second capacitor are the only elements connected to said non-inverted input terminal of said differential amplifier.

4. An optical disk recording/reproducing apparatus comprising:

an optical head which emits a laser light to an optical disk and issues light signals reflected from said optical disk;

a photo electric conversion amplifier means for converting said light signals into a voltage signal;

record signal detection means for detecting a record signal recorded in said optical disk from said voltage signal; and wherein said photoelectric conversion amplifier means includes, a differential amplifier;

a photo-diode, an anode of which is directly connected to an inverted input terminal of said differential amplifier, for converting a light signal into an electric signal;

a first resistor connected between said inverted input terminal and an output terminal of said differential amplifier;

a first capacitor connected in parallel with said first resistor;

a second resistor connected between a non-inverted input terminal of said differential amplifier and a reference voltage source terminal; and a second capacitor connected in parallel with said second resistor, wherein said second resistor and said second capacitor are the only elements connected to said non-inverted input terminal of said differential amplifier.

5. A photoelectric conversion amplifier comprising:

a first differential amplifier having an inverted output terminal and a non-inverted output terminal;

a second differential amplifier, an inverted input terminal of which is connected to said inverted output terminal of the first differential amplifier and a non-inverted input terminal of which is connected to said non-inverted output terminal of the first differential amplifier;

a photo-diode, an anode of which is connected to an inverted input terminal of said first differential amplifier, for converting a light signal into an electric signal;

a first resistor connected between said inverted input terminal of the first differential amplifier and an output terminal of said second differential amplifier;

a first capacitor connected in parallel with said first resistor;

a second resistor connected between a non-inverted input terminal of the first differential amplifier and a reference voltage source terminal; and a second capacitor connected in parallel with said second resistor.

6. An optical disk recording/reproducing apparatus comprising:

an optical head which emits a laser light to an optical disk and issues light signals reflected from said optical disk;

a photo electric conversion amplifier means for converting said light signals into a voltage signal;

focus error signal detection means for detecting a focus error signal from said voltage signal; and wherein said photoelectric conversion amplifier means includes, a first differential amplifier having an inverted output terminal and a non-inverted output terminal;

a second differential amplifier, an inverted input terminal of which is connected to said inverted output terminal of the first differential amplifier and a non-inverted input terminal of which is connected to said non-inverted output terminal of the first differential amplifier;

a photo-diode, an anode of which is connected to an inverted input terminal of said first differential amplifier, for converting a light signal into an electric signal:

a first resistor connected between said inverted input terminal of the first differential amplifier and an output terminal of said second differential amplifier;

a first capacitor connected in parallel with said first resistor;

a second resistor connected between a non-inverted input terminal of the first differential amplifier and a reference voltage source terminal; and a second capacitor connected in parallel with said second resistor.

7. An optical disk recording/reproducing apparatus comprising:

an optical head which emits a laser light to an optical disk and issues light signals reflected from said optical disk;

a photo electric conversion amplifier means for converting said light signals into a voltage signal;

tracking error signal detection means for detecting a tracking error signal from said voltage signal; and wherein said photoelectric conversion amplifier means includes, a first differential amplifier having an inverted output terminal and a non-inverted output terminal;

a second differential amplifier, an inverted input terminal of which is connected to said inverted output terminal of the first differential amplifier and a non-inverted input terminal of which is connected to said non-inverted output terminal of the first differential amplifier;

a photo-diode, an anode of which is connected to an inverted input terminal of said first differential amplifier, for converting a light signal into an electric signal:

a first resistor connected between said inverted input terminal of the first differential amplifier and an output terminal of said second differential amplifier;

a first capacitor connected in parallel with said first resistor;

a second resistor connected between a non-inverted input terminal of the first differential amplifier and a reference voltage source terminal; and a second capacitor connected in parallel with said second resistor.

8. An optical disk recording/reproducing apparatus comprising:

an optical head which emits a laser light to an optical disk and issues light signals reflected from said optical disk;

a photo electric conversion amplifier means for converting said light signals into a voltage signal;

record signal detection means for detecting a record signal recorded in said optical disk from said voltage signal; and wherein said photoelectric conversion amplifier means includes,
- a first differential amplifier having an inverted output terminal and a non-inverted output terminal;
- a second differential amplifier, an inverted input terminal of which is connected to said inverted output terminal of the first differential amplifier and a non-inverted input terminal of which is connected to said non-inverted output terminal of the first differential amplifier;
- a photo-diode, an anode of which is connected to an inverted input terminal of said first differential amplifier, for converting a light signal into an electric signal:
- a first resistor connected between said inverted input terminal of the first differential amplifier and an output terminal of said second differential amplifier;
- a first capacitor connected in parallel with said first resistor;
- a second resistor connected between a non-inverted input terminal of the first differential amplifier and a reference voltage source terminal; and
- a second capacitor connected in parallel with said second resistor.

9. An optical disk recording/reproducing apparatus comprising:
- an optical head which emits a laser light to an optical disk and issues light signals reflected from said optical disk;
- a first photoelectric conversion amplifier means for converting a first output of said light signals into a first voltage signal;
- a second photoelectric conversion amplifier means for converting said first output of said light signals into a second voltage signal;
- a third photoelectric conversion amplifier means for converting a second output of said light signals into a third voltage signal;
- a fourth photoelectric conversion amplifier means for converting said second output of said light signals into a fourth voltage signal;
- focus error signal detection means for detecting a focus error signal from said first voltage signal and said second voltage signal;
- tracking error signal detection means for detecting a tracking error signal from said third voltage signal and said fourth voltage signal; and
- record signal detection means for detecting a record signal recorded in said optical disk from said first, second, third and fourth voltage signals;
- wherein each of said photoelectric conversion amplifier means comprise,
  - a differential amplifier;
  - a photo-diode, an anode of which is directly connected to an inverted input terminal of said differential amplifier, for converting each of said light signals into an electric signal;
  - a first circuit element consisting of a first resistor and a first capacitor which are connected in parallel with each other, one end of said first circuit element being connected to said inverted input terminal and said anode, another end of said first circuit element being connected to an output terminal of said differential amplifier;
  - a second circuit element consisting of a second resistor and a second capacitor which are connected in parallel with each other, one end of said second circuit element being the only element connected to a non-inverted input terminal of said differential amplifier, another end of said second circuit element being connected to a reference voltage source terminal.

10. An optical disk recording/reproducing apparatus comprising:
- an optical head which emits a laser light to an optical disk and issues light signals reflected from said optical disk;
- a first photoelectric conversion amplifier means for converting a first output of said light signals into a first voltage signal;
- a second photoelectric conversion amplifier means for converting said first output of said light signals into a second voltage signal;
- a third photoelectric conversion amplifier means for converting a second output of said light signals into a third voltage signal;
- a fourth photoelectric conversion amplifier means for converting said second output of said light signals into a fourth voltage signal;
- focus error signal detection means for detecting a focus error signal from said first voltage signal and said second voltage signal;
- tracking error signal detection means for detecting a tracking error signal from said third voltage signal and said fourth voltage signal; and
- record signal detection means for detecting a record signal recorded in said optical disk from said first, second, third and fourth voltage signals;
- wherein each of said photoelectric conversion amplifier means comprise,
  - a first differential amplifier having an inverted output terminal and a non-inverted output terminal;
  - a second differential amplifier, an inverted input terminal of which is connected to said inverted output terminal of the first differential amplifier and a non-inverted input terminal of which is connected to said non-inverted output terminal of the first differential amplifier;
  - a photo-diode, an anode of which is connected to an inverted input terminal of said first differential amplifier, for converting a light signal into an electric signal;
  - a first circuit element consisting of a first resistor and a first capacitor which are connected in parallel with each other, one end of said first circuit element being connected to said inverted input terminal of said first differential amplifier and said anode, another end of said first circuit element being connected to an output terminal of said second differential amplifier;
  - a second circuit element consisting of a second resistor and a second capacitor which are connected in parallel with each other, one end of said second circuit element being connected to a non-inverted input terminal of said first differential amplifier, another end of said second circuit element being connected to a reference voltage source terminal.

* * * * *